US009610754B2

(12) United States Patent
Cheah et al.

(10) Patent No.: US 9,610,754 B2
(45) Date of Patent: *Apr. 4, 2017

(54) FABRICATION OF HIGHLY FLEXIBLE NEAR-INFRARED METAMATERIALS

(71) Applicant: Hong Kong Baptist University, Hong Kong (HK)

(72) Inventors: Kok Wai Cheah, Hong Kong (HK); Guixin Li, Hong Kong (HK)

(73) Assignee: Hong Kong Baptist University, Hong Kong (HK)

( * ) Notice: Subject to any disclaimer, the term of this patent is extended or adjusted under 35 U.S.C. 154(b) by 677 days.

This patent is subject to a terminal disclaimer.

(21) Appl. No.: 13/726,127

(22) Filed: Dec. 23, 2012

(65) Prior Publication Data
US 2013/0160936 A1 Jun. 27, 2013

Related U.S. Application Data

(60) Provisional application No. 61/579,668, filed on Dec. 23, 2011.

(51) Int. Cl.
*B44C 1/165* (2006.01)
*B32B 37/00* (2006.01)
(Continued)

(52) U.S. Cl.
CPC ............... *B32B 27/36* (2013.01); *B32B 3/16* (2013.01); *B32B 3/30* (2013.01); *B32B 7/06* (2013.01);
(Continued)

(58) Field of Classification Search
CPC  B32B 27/36; B32B 38/10; B32B 3/16; B32B 3/30; B32B 7/06; B32B 7/12;
(Continued)

(56) References Cited

U.S. PATENT DOCUMENTS 4,599,135 A 7/1986 Tsunekawa et al.
2007/0237478 A1* 10/2007 D'Aguanno et al. ......... 385/129
(Continued)

FOREIGN PATENT DOCUMENTS

WO  WO 2010077529 A2 * 7/2010 ............ B82Y 20/00

OTHER PUBLICATIONS

Li et al. "Highly flexible near-infrared metamaterials", Optics Express, vol. 20, No. 1, pp. 397-402, published Dec. 21, 2011.*
(Continued)

*Primary Examiner* — Alex Efta
(74) *Attorney, Agent, or Firm* — Spruson & Ferguson (Hong Kong) Limited

(57) ABSTRACT

A method and apparatus of fabrication of a multilayer flexible metamaterial can be fabricated using flip chip transfer (FCT) technique. This technique is different from other similar techniques such as metal lift off process, which fabricates the nanostructures directly onto the flexible substrate or nanometer printing technique. It is a solution-free FCT technique using double-side optical adhesive as the intermediate transfer layer and a tri-layer metamaterial nanostructures on a rigid substrate can be transferred onto adhesive first. Another embodiment of the present invention is the fabrication method and apparatus that allows the transfer of the metamaterial from a rigid substrate such as glass, quartz and metals onto a flexible substrate such as plastic or polymer film. Thus, a flexible metamaterial can be fabricated independent of the original substrate used.

12 Claims, 6 Drawing Sheets

(51) Int. Cl.

| | |
|---|---|
| *B29C 63/00* | (2006.01) |
| *B32B 27/36* | (2006.01) |
| *B32B 3/30* | (2006.01) |
| *B32B 7/06* | (2006.01) |
| *B32B 7/12* | (2006.01) |
| *B32B 38/10* | (2006.01) |
| *B32B 37/26* | (2006.01) |
| *B32B 37/12* | (2006.01) |
| *B32B 37/14* | (2006.01) |
| *B32B 3/16* | (2006.01) |
| *G02F 1/01* | (2006.01) |
| *G02B 1/00* | (2006.01) |

(52) U.S. Cl.
CPC ............... *B32B 7/12* (2013.01); *B32B 37/12* (2013.01); *B32B 37/144* (2013.01); *B32B 37/26* (2013.01); *B32B 38/10* (2013.01); *G02B 1/002* (2013.01); *G02F 1/01* (2013.01); *G02F 2202/30* (2013.01); *Y10T 428/31786* (2015.04)

(58) Field of Classification Search
CPC ....... B32B 37/12; B32B 37/144; B32B 37/26; C02B 1/002; G02F 1/01; G02F 2202/30
See application file for complete search history.

(56) References Cited

U.S. PATENT DOCUMENTS

| | | |
|---|---|---|
| 2010/0053763 A1 | 3/2010 | Chowdhury et al. |
| 2010/0271692 A1 | 10/2010 | Hor et al. |
| 2011/0240476 A1* | 10/2011 | Wang ............... B82Y 20/00 205/67 |
| 2011/0268910 A1* | 11/2011 | Bratkovski ........... H01F 1/0018 428/78 |

OTHER PUBLICATIONS

Falco et al., "Flexible metamaterials at visible wavelengths", New Journal of Physics, issue 12, 2010. published online Nov. 4, 2010.*
Henzie et al. "Multiscale patterning of plasmonic metamaterials", Nature nanotechnology, vol. 2, pp. 549-554, published Sep. 2007.*
Chanda et al. "Large-area flexible 3D optical negative index metamaterial formed by nanotransfer printing", Nature Nanotechnology, vol. 6, pp. 402-407, published online Jun. 5, 2011.*
Ricci et al., "Tunability of Superconducting Metamaterials", IEEE Transactions on Applied Superconductivity. vol. 17, No. 2, pp. 918-921, published Jun. 2007.*
C.R.M. Grovenor, "Microelectronic Materials", CRC Press, 1989.
Sommer et al., "Influence of deposition conditions and substrate morphology on the electrical properties of sputtered ZnO:Al grown on texture-etched glass", Aug. 2014.

* cited by examiner

FABRICATION OF HIGHLY FLEXIBLE NEAR-INFRARED METAMATERIALS

CROSS-REFERENCE TO RELATED APPLICATIONS

The present application claims priority to the U.S. Provisional Patent Application No. 61/579,668 filed Dec. 23, 2011; the disclosure of which is incorporated herein by reference in its entirety.

FIELD OF INVENTION

The present invention relates to method and apparatus of fabrication of plasmonic or metamaterial nanostructures. In particular, the present invention relates to method and apparatus of fabrication of a tri-layer flexible metamaterials that can work at near infrared (NIR) regime that can be fabricated on transparent polyethylene terephthalate (PET) substrate using flip chip transfer (FCT) technique. FCT technique is solution-free and can also be applied to fabricate other functional nanostructures device on flexible substrate.

BACKGROUND OF INVENTION

Plasmonic or metamaterial nanostructures are usually fabricated on rigid substrate i.e. glass, silicon. Optical functionality of such kinds of nanostructures is limited by the planar surface and thus sensitive to the incident angle of light. Over the last ten years, the understanding and broader application implication of metamaterial has been greatly extended. In fact, metamaterial has been proposed for optical cloak, illusion, absorber, negative index materials etc. in which the electromagnetic response could be engineered by scaling the size parameter of the artificial structures. Furthermore, the shape of the metamaterial device is also an important parameter for manipulating the light scattering. For example, optical cloak and hyperlens fabricated with curved structure were used to meet the modulation of anisotropic refractive index. Metamaterial and plasmonic devices on flexible tape, silk, paper and stretchable PDMS substrate have been demonstrated to show unusual optical response. However, most of the reported flexible metamaterial or plasmonic devices work in the Gigahertz, Terahertz, or Far-infrared frequency. For NIR and visible wavelength applications, the feature size of each unit cell has to be scaled down to tens of nanometer. Most of the current optical metamaterial nanostructures were fabricated on rigid substrate such as glass, silicon and they are fabricated using fabrication techniques such as focus ion beam (FIB), e-beam Lithography (EBL), nano-imprint lithography (NIL) and soft interference lithography (SIL). Recently, single layer flexible metamaterial working at visible-NIR wavelength was directly fabricated on PET substrate using EBL. However, the chemical solution used in metal lift-off process needs to be carefully chosen to avoid chemical damages on the flexible substrate. Besides, the curved surface of the PET substrate brings additional difficulty for the focusing of electron in EBL process. Another important progress in this area is realizing large area 3D flexible metamaterial by nanometer printing technique. In Z. C. Chen, N. R. Han, Z. Y. Pan, Y. D. Gong, T. C. Chong, and M. H. Hong, "Tunable resonance enhancement of multi-layer terahertz metamaterials fabricated by parallel laser micro-lens array lithography on flexible substrates," *Opt. Express* 1, 151-157 (2011), a stamp is used to transfer nanostructure to target substrate, and the advantage of this fabrication method is that the stamp can be reused for many times. The U.S. Patent Application Publication No. 2010/0301971 describes an exemplary metamaterial comprising a flexible dielectric substrate that is tunable using an electrical control signal to adjust its electromagnetic properties or via the utility of a tunable resonant circuit that includes a phase change material, wherein the resonant frequency of said metamaterial is tunable via modification of said phase change material either via an electrical control signal or by adjusting the composition of said phase change material. Furthermore, in the prior art, the flexible metamaterial fabricated is dependent on the original substrate used.

The objective of the present invention is to provide method and apparatus of fabrication of a multilayer flexible metamaterial using flip chip transfer (FCT) technique. This technique is different from other similar techniques such as metal lift off process, which fabricates the nanostructures directly onto the flexible substrate or nanometer printing technique. It is a solution-free FCT technique using double-side optical adhesive as the intermediate transfer layer and a tri-layer metamaterial nanostructures on a rigid substrate, which can be transferred onto the adhesive first. Then, the thin optical adhesive and the nanostructure can be conformably coated onto flexible substrates, such as the bent PET substrate, paper etc. Thus, the flexible metamaterial can be fabricated independent of the original substrate used. This flexible metamaterial is tunable via physical manipulation of its flexible substrate with no requirement of changing the material composition of the substrate.

Citation or identification of any reference in this section or any other section of this application shall not be construed as an admission that such reference is available as prior art for the present application.

SUMMARY OF INVENTION

Embodiments of the present invention include methods and apparatus of fabrication of a multilayer flexible metamaterial that can work at near infrared (NIR) regime and that it can be fabricated on a transparent PET substrate using flip chip transfer (FCT) technique. The flexibility allows the novel NIR metamaterial device to be bended and stretched, which alters the device structure. Since the resonant frequency of each device is a function of the device structure, the resonant frequency can be tuned by the bending and stretching of the substrate.

In a first embodiment, the present invention provides a method of fabrication of a multilayer flexible metamaterial that can work at near infrared (NIR) regime and that it can be fabricated on a transparent PET substrate using flip chip transfer (FCT) technique.

In a second embodiment, the present invention provides an apparatus for fabricating a multilayer flexible metamaterial that can work at near infrared (NIR) regime and that it can be fabricated on a transparent PET substrate using flip chip transfer (FCT) technique.

In a third embodiment, the present invention provides a method of fabrication of a multilayer flexible metamaterial that allows the transfer of the metamaterial from a rigid substrate such as glass, quartz and metals onto a flexible substrate such as plastic or polymer film. Thus, a flexible metamaterial can be fabricated independent of the original substrate used.

In a fourth embodiment, the present invention provides an apparatus for fabricating a multilayer flexible metamaterial that allows the transfer of the metamaterial from a rigid substrate such as glass, quartz and metals onto a flexible substrate such as plastic or polymer film, wherein, a flexible metamaterial can be fabricated independent of the original substrate used.

In a fifth embodiment, the present invention provides a novel NIR metamaterial device that can be transformed into various shapes by bending the PET substrate.

Those skilled in the art will appreciate that the invention described herein is susceptible to variations and modifications other than those specifically described.

The invention includes all such variation and modifications. The invention also includes all of the steps and features referred to or indicated in the specification, individually or collectively and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF DRAWINGS

The above and other objects and features of the present invention will become apparent from the following description of the invention, when taken in conjunction with the accompanying drawings, in which.

DETAILED DESCRIPTION OF INVENTION

The present invention is not to be limited in scope by any of the specific embodiments described herein. The following embodiments are presented for exemplification only.

The present invention provides a method and apparatus of fabrication of a multilayer flexible metamaterial can be fabricated using flip chip transfer (FCT) technique. This technique is different from other similar techniques such as metal lift off process, which fabricates the nanostructures directly onto the flexible substrate or nanometer printing technique. It is a solution-free FCT technique using double-side optical adhesive as the intermediate transfer layer and a tri-layer metamaterial nanostructures on a rigid substrate can be transferred onto adhesive first. Another embodiment of the present invention is the fabrication method and apparatus that allows the transfer of the metamaterial from a rigid substrate such as glass, quartz and metals onto a flexible substrate such as plastic or polymer film. Thus, a flexible metamaterial can be fabricated independent of the original substrate used.

Device Fabrication

Figure 1:
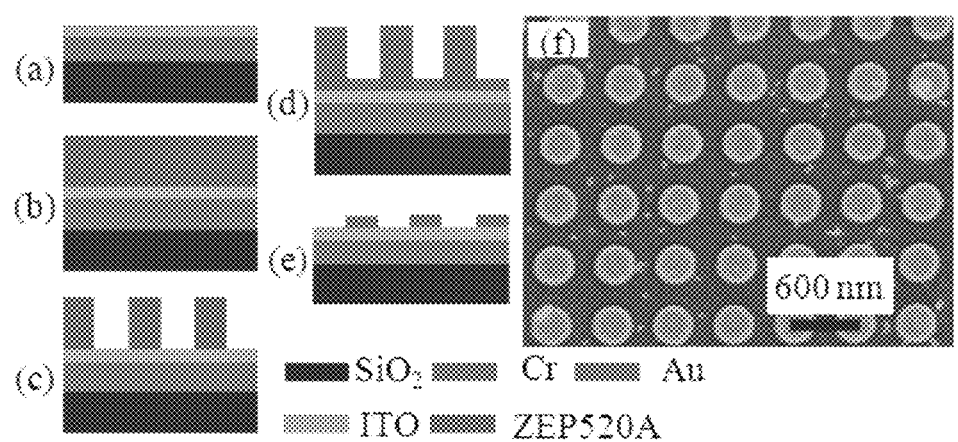
FIGS. 1(a) to 1(e) show the EBL steps in the fabrication of the absorber metamaterials with period of the disc-array device is 600 nm, disc diameter: 365 nm, thickness of gold: 50 nm, and thickness of Cr: 30 nm; 1(f) is the scanning electron microscope (SEM) image of the two dimensional gold disc-array absorber meta materials.

A schematic fabrication process of multilayer metamaterials is shown in FIG. 1. First, the multilayer plasmonic or metamaterial device was fabricated on chromium (Cr) coated quartz using conventional EBL process. The 30 nm thick Cr layer was used as a sacrificial layer. Then a gold/ITO (50 nm/50 nm) thin film was deposited onto the Cr surface using thermal evaporation and RF sputtering method respectively. Next, a ZEP520A (positive e-beam resist) thin film with thickness of about 300 nm was spun on top of the ITO/gold/Cr/quartz substrate and a two dimensional hole array was obtained on the ZEP520A using the EBL process. To obtain the gold nanostructure (disc pattern), a second 50 nm thick gold thin film was coated onto the e-beam patterned resist. Finally, a two dimensional gold disc-array nanostructures was formed by removing the resist residue. The area size of each metamaterial pattern is 500 μm by 500 μm, and the period of the disc-array is 600 nm with disc diameter of ~365 nm.

Flip Chip Transfer (FCT) Technique

Figure 2:
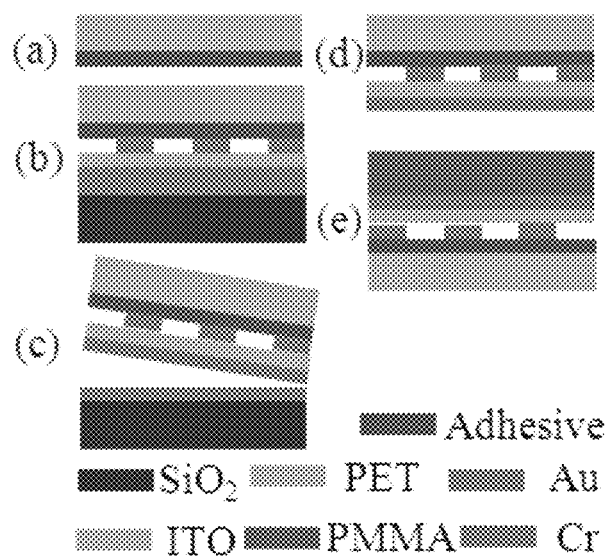
FIGS. 2(a) to 2(e) show the schematic diagrams of the flip chip transfer method, the tri-layer absorber metamaterial with an area of 500 μm by 500 μm was transferred to a PET flexible substrate.

Transfer process of flexible absorber metamaterial is shown in FIG. 2, double-sided sticky optically clear adhesive (50 μm thick; e.g. a commercially available product manufactured by 3M) was attached to the PET substrate (70 μm thick). Thus the tri-layer metamaterial device was placed in intimate contact with optical adhesive and sandwiched between the rigid substrate and the optical adhesive. Note that the Cr thin film on quartz substrate was exposed to the air for several hours after the RF sputtering process, such that there is a thin native oxide film on the Cr surface. Hence the surface adhesion between Cr and gold is much weaker than that of gold/ITO/gold disc/optical adhesive bounding. This allows the tri-layer metamaterial nanostructure to be peeled off from the Cr coated quartz substrate. Once the metamaterial nanostructure was transferred onto the PET substrate, it possesses sufficient flexibility to be bended into various shapes. Finally, the metamaterial nanostructure was encapsulated by spin-coating a 300 nm thick PMMA layer on top of the device.

In another embodiment, the present invention provides a novel NIR metamaterial device that can be transformed into various shapes by bending the PET substrate.

Figure 3:
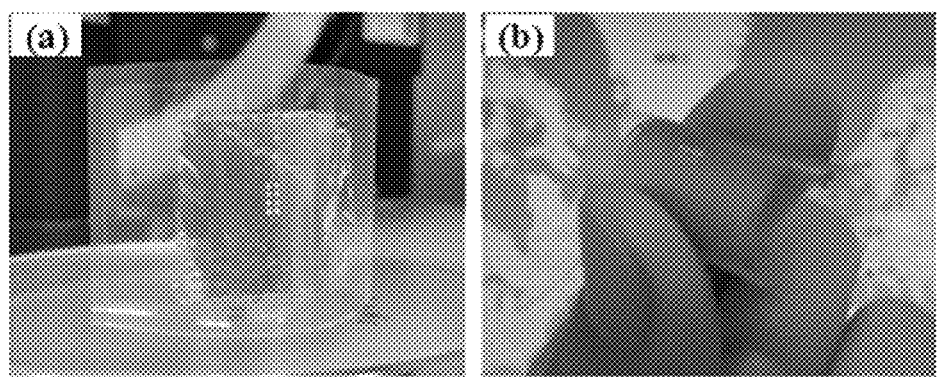
FIGS. 3(a) and 3(b) show the flexible NIR absorber metamaterials on a transparent PET substrate; each separated pattern has an area size of 500 μm by 500 μm.

FIG. 3(a) shows the flexible absorber metamaterial sandwiched by the transparent PET and PMMA thin film. Several absorber metamaterial nanostructures with area size of 500 μm by 500 μm were fabricated on flexible substrate. In fact, using the flexibility property of the PET layer, the absorber metamaterial device can be conformed into many shape e.g. cylindrical shape (FIG. 3(b)). The minimum radius of the cylindrical substrate is about 3 mm, not obvious defect on the metamaterial device can be observed after 10 times of repeatable bending tests.

Optical Characterization and Simulation

Figure 4:
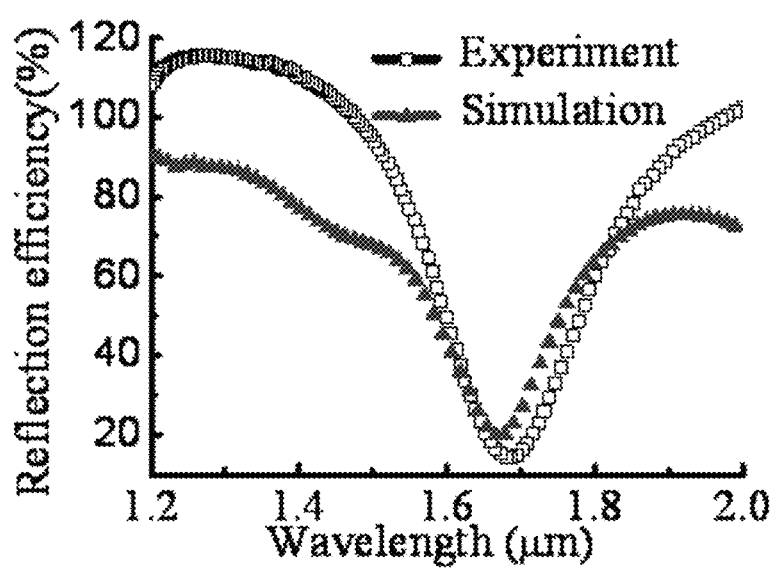
FIG. 4 shows the relative reflection spectrum of the absorber metamaterials on quartz substrate (gold disc/ITO/gold/Cr/quartz), NIR light was normally focused on the device and the reflection signal and was collected by the 15× objective lens, and square-dotted line is the experimental result and triangle-dotted line is the simulated reflection spectrum using RCWA method.

The tri-layer metal/dielectric nanostructure discussed above is an absorber metamaterial device. The design of the device is such that the energy of incident light is strongly localized in ITO layer. The absorbing effects of the NIR tri-layer metamaterial architecture could be interpreted as localized surface plasmon resonance or magnetic resonance. The absorbing phenomenon discussed here is different from the suppression of transmission effect in metal disc arrays, in which the incident light is strongly absorbed due to resonance anomaly of the ultrathin metal nanostructure. To characterize the optical property of gold disc/ITO/gold absorber metamaterial, fourier transform infrared spectrometer (FTIR) was used to measure the reflection spectrum of the absorber metamaterial. By combining the infrared microscope with the FTIR spectrometer, transmission and reflection spectra from micro-area nanophotonic device can be measured. In FIG. 4, the reflection spectrum (Experiment line plot) from air/metamaterial interface was measured with sampling area of 100 μm by 100 μm. At the absorption peak with wavelength of 1690 nm, reflection efficiency is about 14%, i.e. the absorber metamaterial works at this wavelength. In RCWA simulation (Simulation line plot), the real optical constants in E. D. Palik, *Handbook of optical constants of solids*, Academic Press, New York, 1985 is used; the content of which is incorporated herein by reference in its entirety. At resonant wavelength, the experiment and calculation agree well with each other.

Figure 5:
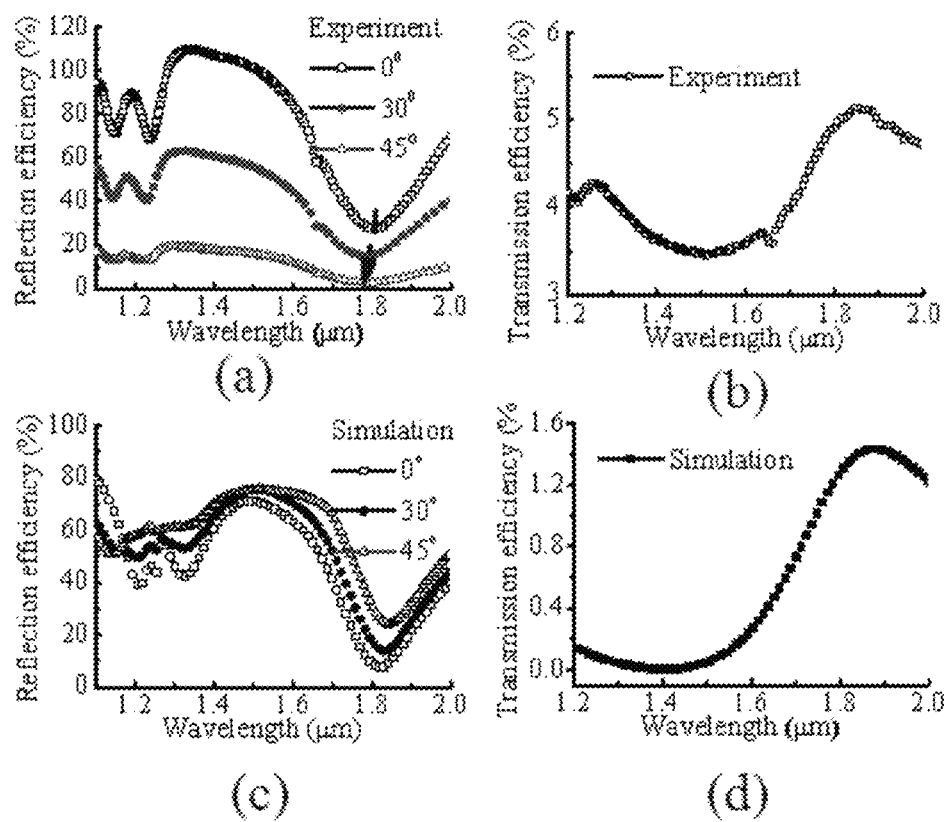
FIGS. 5(a) to (d) show: (a) Angle resolved back reflection spectra measured on flexible metamaterial (with curved surface), the light being incident from PET side and the back reflection was collected by NIR detector; (b) transmission spectra measured on the flexible absorber metamaterial, the light being incident from the PMMA side was collected from the PET side; and (c) and (d) are simulated reflection and transmission spectra on flexible absorber metamaterial using RCWA method.

Reflection spectrum of the flexible absorber metamaterial is shown in FIG. 5(a) (0° line plot). Compared to FTIR result in FIG. 4, the absorption dip of the flexible metamaterial has red shifted to ~1.81 μm. This red shift is mainly due to the refractive index change of the surrounding medium (refractive index of optical adhesive and PET is about 1.44). In FIG. 5(c) and FIG. 5(d), three dimensional rigorous coupled wave analysis (RCWA) method is employed to calculate the reflection and transmission spectra on the absorber metamaterial, and experimentally confirmed parameters of materials of gold, ITO, Cr, $SiO_2$ and PET were used. Resonant absorption at wavelength of ~1.81 μm can also be observed in theoretical simulations. However, there are two resonant dips around 1.2 μm in the measured reflection spectrum. In the RCWA calculation (FIG. 5(c)), the double dips are reproduced and ascribed to two localized resonant modes, as they are not very sensitive to incident angles. For the angle dependent calculation, TE polarized light is used (electric field is perpendicular to incident plane) to fit the experimental result. While the incident angle is changed from 0 to 45 degree, reflection efficiency shows an increasing trend as light cannot be efficiently localized under large angle incidence. However, the back reflection efficiency in experiment (FIG. 5(a)) decreases obviously. This is because our current experimental setup (discussed in next section) only allows us to collect the back-reflection signal (incident and collection direction are same as each other), and the collection efficiency is very low for large incident angles. In FIG. 5(b), transmission spectrum of the flexible metamaterial was measured using the same FTIR setup, the main difference is light was incident from the air/PMMA interface. A Fano-type transmission peak is observed at wavelength ~1.85 μm. At resonant wavelength, the transmission efficiency from experiment is higher than that in the theoretical simulation (FIG. 5(d)). This could be due to defects on gold planar film and the two dimensional disc arrays, which enhances the efficiency of leakage radiation and thus contribute to the higher transmission efficiency in the measured results.

Figure 6:
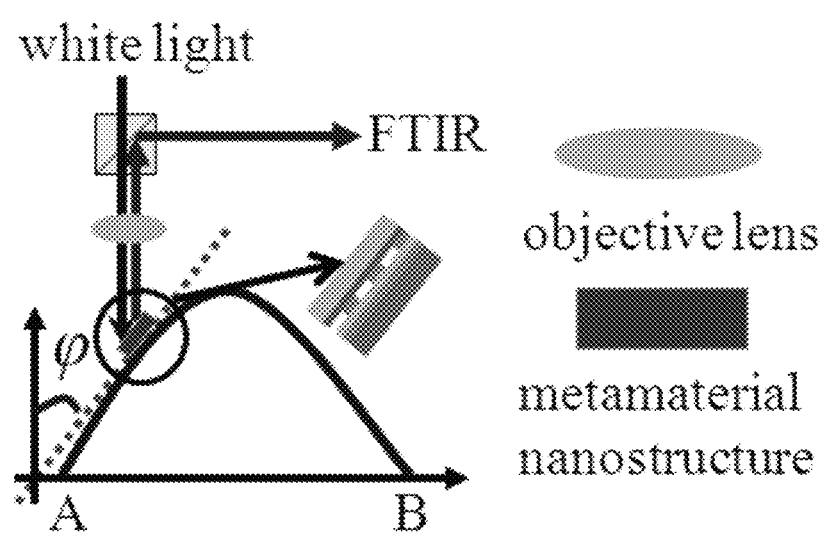
FIG. 6 shows experiment diagram of measuring the reflection spectrum of metamaterial device under different bending condition; the flexible substrate was bent by adjusting the distance between A and B, and the incident angle 90°-ø (varying from 0 to 45 degree) was defined by the slope of PET substrate and direction of incident light.

As shown in FIG. 6, bending PET substrate allows us to measure the optical response of absorber metamaterial under different curving shape. The shape of the bent PET substrate was controlled by adjusting the distance between substrate ends (A and B). The angle for the resolved back-reflection on the absorber device was measured by varying the bending conditions. From FIG. 6, the incident angle (90°−ø) was determined from the bending slope at the position of the metamaterial device. From FIG. 5(a), it is observed that when the incident angle was increased from 0 to 45 degree, the intensity of the back reflection becomes weaker and the absorption dip becomes shallower. Nevertheless, it shows that the resonant absorption wavelength of the flexible absorber metamaterial is not sensitive to the incident angle of light. Devices made from the metamaterials can be made into highly sensitive sensors. This invention provideds a novel technique in fabricating metamaterial devices on a flexible substrate. The flexibility allows the device to bending and stretching, which alters the device structure. Since the resonant frequency of each device is a function of the device structure, the resonant frequency can be tuned by the bending and stretching of the substrate. Hence, another embodiment of the present invention is a metamaterial that allows a physical means to change the structure of the material, which leads to a change in its resonant frequency. There is no need to change the material composition. An embodiment of the present metamaterial is flexible plasmonic or metamaterial nanostructure device used as an electromagnetic wave absorber.

In the aforementioned embodiments of the present invention, it has reported a highly flexible tri-layer absorber metamaterial device working at NIR wavelength. By using FCT method, the tri-layer gold disc/ITO/gold absorber metamaterial was transferred from quartz substrate to a transparent PET substrate using optically clear adhesive (e.g. a commercially available product manufactured by 3M). Furthermore, the tri-layer absorber metamaterial was encapsulated by PMMA thin film and optical adhesive layer to form a flexible device. FTIR experiment showed that the absorber metamaterial works well on both the quartz substrate and the highly flexible PET substrate. Besides, angle insensitive absorbing effects and Fano-type transmission resonance were observed on this flexible metamaterial.

Moreover, the solution-free FCT technique described in this invention can also be used to transfer other visible-NIR metal/dielectric multilayer metamaterial onto flexible substrate. The flexible metamaterial working at visible-NIR regime will show more advantages in manipulation of light in three dimensional space, especially when the metamaterial architecture is designed on curved surfaces.

Modifications and variations such as would be apparent to a skilled addressee are deemed to be within the scope of the present invention.

INDUSTRIAL APPLICABILITY

The present invention discloses methods and apparatus of fabrication of plasmonic or metamaterial nanostructures. In particular, the present invention relates to methods and apparatus of fabrication of a tri-layer flexible metamaterials that can work at near infrared (NIR) regime and can be fabricated on transparent polyethylene terephthalate (PET) substrate using flip chip transfer (FCT) technique. FCT technique is solution-free and can also be applied to fabricate other functional nanostructures device on flexible substrate.

If desired, the different functions discussed herein may be performed in a different order and/or concurrently with each other. Furthermore, if desired, one or more of the above-described functions may be optional or may be combined.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extend. All publications recited herein are hereby incorporated by reference in their entirety.

What we claim:

1. A fabrication method of a flexible two or more layered metamaterial comprising:
   fabricating a two or more layered metamaterial on flexible substrate using a flip chip transfer technique, wherein the flip chip transfer technique comprising:
      depositing the two or more layered metamaterial onto a rigid substrate to form a rigid first substrate with metamaterial;
      exposing the rigid first substrate with metamaterial to air to form an oxide film on a surface of the rigid substrate where the two or more layered metamaterial is deposited onto;
      attaching a double-sided optically clear adhesive on a flexible substrate to form a flexible second substrate with adhesive;
      placing the rigid first substrate with metamaterial in contact with the double-sided optically clear adhesive on the flexible second substrate with adhesive; and
      peeling the two or more layered metamaterial off from the rigid first substrate with metamaterial to form the flexible two or more layered metamaterial;
   wherein the two or more layered metamaterial comprising at least one conductor layer and at least one dielectric layer.

2. The fabrication method according to claim 1, wherein the flexible substrate is permeable to electromagnetic radiation.

3. The fabrication method according to claim 1, wherein the flexible two or more layered metamaterial can be transformed into various shaped devices by physical manipulation.

4. The fabrication method according to claim 1, wherein the flexible substrate is a thermoplastic polymer resin comprising:
   polyethylene terephthalate (PET), and
   chemical composition thereof.

5. The fabrication method according to claim 1, wherein the deposition of the two or more layered metamaterial onto the rigid substrate comprises RF sputtering of the two or more layered metamaterial onto the rigid substrate.

6. The fabrication method according to claim 1, wherein the oxide film causes a surface adhesion between the two or more layered metamaterial and the rigid substrate to be weaker than a surface adhesion of the double-sided optically clear adhesive.

7. A fabrication method of a flexible two or more layered metamaterial comprising:
   depositing a two or more layered metamaterial onto a rigid first substrate;
   exposing the rigid first substrate with the two or more layered metamaterial to air to form an oxide film on a surface of the rigid first substrate where the two or more layered metamaterial is deposited onto;
   affixing a flexible second substrate onto the two or more layered metamaterial deposited on of the rigid first substrate;
   peeling the two or more layered metamaterial affixed to the flexible second substrate from the rigid first substrate such that the flexible two or more layered metamaterial is fabricated.

8. The fabrication method according to claim 7, wherein the flexible second substrate being permeable to electromagnetic radiation.

9. The fabrication method according to claim 7, wherein the flexible two or more layered metamaterial can be transformed into various shaped devices by physical manipulation.

10. The fabrication method according to claim 7, wherein the flexible second substrate is a thermoplastic polymer resin comprising:
   polyethylene terephthalate (PET), and
   chemical composition thereof.

11. The fabrication method according to claim 7, wherein the deposition of the two or more layered metamaterial onto the rigid first substrate comprises RF sputtering of the two or more layered metamaterial onto the rigid first substrate.

12. The fabrication method according to claim 7, wherein the oxide film causes a surface adhesion between the two or more layered metamaterial and the rigid first substrate to be weaker than a surface adhesion between the two or more layered metamaterial and the flexible second substrate.

* * * * *